United States Patent
Hirano et al.

(10) Patent No.: US 11,428,300 B2
(45) Date of Patent: Aug. 30, 2022

(54) ELECTRIC ACTUATOR

(71) Applicant: NTN Corporation, Osaka (JP)

(72) Inventors: Shinsuke Hirano, Shizuoka (JP);
Yoshinori Ikeda, Shizuoka (JP);
Tatsunori Shimizu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/973,590

(22) PCT Filed: Jun. 25, 2019

(86) PCT No.: PCT/JP2019/025102
§ 371 (c)(1),
(2) Date: Dec. 9, 2020

(87) PCT Pub. No.: WO2020/004371
PCT Pub. Date: Jan. 2, 2020

(65) Prior Publication Data
US 2021/0254690 A1 Aug. 19, 2021

(30) Foreign Application Priority Data

Jun. 29, 2018 (JP) .............................. JP2018-124581

(51) Int. Cl.
*F16H 25/24* (2006.01)
*H02K 7/06* (2006.01)

(52) U.S. Cl.
CPC ............... *F16H 25/24* (2013.01); *H02K 7/06* (2013.01)

(58) Field of Classification Search
CPC ......... Y10T 74/18576; Y10T 74/18688; F16H 25/24

(Continued)

(56) References Cited

U.S. PATENT DOCUMENTS

| | | | |
|---|---|---|---|
| 2009/0165581 A1 | 7/2009 | Koyagi et al. | |
| 2010/0059944 A1* | 3/2010 | Oteman | B60G 17/0157 280/6.157 |

(Continued)

FOREIGN PATENT DOCUMENTS

| | | |
|---|---|---|
| JP | 2009-156354 | 7/2009 |
| JP | 2017-184484 | 10/2017 |
| JP | 2018-74791 | 5/2018 |

OTHER PUBLICATIONS

International Preliminary Report on Patentability and Written Opinion of the International Searching Authority issued Dec. 29, 2020 in International (PCT) Application No. PCT/JP2019/025102.

(Continued)

*Primary Examiner* — Randellj Krug
(74) *Attorney, Agent, or Firm* — Wenderoth, Lind & Ponack, L.L.P.

(57) ABSTRACT

An electric actuator includes an electric motor 5, and a motion conversion mechanism 4 configured to convert a rotary motion of the electric motor 5 into a linear motion, in which the motion conversion mechanism 4 has a nut 17 rotatably supported, and a screw shaft 18 configured to axially move in accordance with a rotation of the nut 17, the electric actuator is provided with a case 20 covering an axial end surface 18b of the screw shaft 18, and the electric actuator is provided with an elastic member 30 between the axial end surface 18b of the screw shaft 18 and an opposite surface 20b of the case 20 facing the axial end surface 18b of the screw shaft 18.

3 Claims, 4 Drawing Sheets

(58) Field of Classification Search
USPC .......................................................... 74/89.37
See application file for complete search history.

(56) References Cited

U.S. PATENT DOCUMENTS

2013/0221625 A1\* 8/2013 Pare ................... B60G 17/0521
280/5.514
2019/0264788 A1 8/2019 Shimizu

OTHER PUBLICATIONS

International Search Report dated Aug. 13, 2019 in International (PCT) Application No. PCT/JP2019/025102.

\* cited by examiner

ELECTRIC ACTUATOR

TECHNICAL FIELD

The present invention relates to an electric actuator.

BACKGROUND ART

In recent years, motorization has progressed in order to save labor and reduce fuel consumption of vehicles. For example, a system for operating an automatic transmission, a brake, a steering wheel, and the like of an automobile by power of an electric motor has been developed and put on the market.

As an actuator used for such an application, for example, Patent Literature 1 discloses an actuator that converts a rotary motion of an electric motor into a linear motion using a ball screw mechanism and outputs the linear motion. Further, this electric actuator is provided with a shaft case accommodating a rear end of the screw shaft configuring the ball screw mechanism.

CITATIONS LIST

Patent Literature 1: JP 2017-184484 A

SUMMARY OF INVENTION

Technical Problem

However, as described in Patent Literature 1, in a configuration where the screw shaft is covered with the case, the rear end of the screw shaft may collide with the inner surface of the case due to a handling error during assembly or a malfunction of the electric actuator, and may damage the case.

An object of the present invention is therefore to provide an electric actuator capable of preventing damage to a case due to a collision with a screw shaft.

Solutions to Problem

In order to solve the above problems, in the present invention, an electric actuator includes an electric motor, and a motion conversion mechanism configured to convert a rotary motion of the electric motor into a linear motion, in which the motion conversion mechanism has a nut rotatably supported, and a screw shaft configured to axially move in accordance with a rotation of the nut, the electric actuator is provided with a case covering an axial end surface of the screw shaft, and the electric actuator is provided with an elastic member between the axial end surface of the screw shaft and an opposite surface of the case facing the axial end surface of the screw shaft.

By providing the elastic member between the axial end surface of the screw shaft and the opposite surface of the case facing the screw shaft in this way, even if the axial end surface of the screw shaft collides with the opposite surface of the case, the elastic member functions as a cushioning member that cushions an impact on the case due to this collision, and can avoid damage to the case.

The elastic member may be provided on the axial end surface of the screw shaft. In this case, the elastic member provided on the axial end surface of the screw shaft contacts the opposite surface of the case, thereby preventing the case from being damaged.

As a configuration in which the elastic member is provided on the axial end surface of the screw shaft, for example, a configuration can be adopted in which the screw shaft is provided with a hole in an axial direction on the axial end surface of the screw shaft, and the elastic member is provided with an insertion part to be inserted into the hole.

When the elastic member has the above insertion part, the insertion part preferably has an outer diameter set to be smaller than an inner diameter of the hole, and the insertion part is preferably provided with a protrusion in press-contact with an inner peripheral surface of the hole with the insertion part inserted into the hole. By setting the outer diameter of the insertion part to be smaller than the inner diameter of the hole in this way, the insertion part can be easily inserted into the hole, and damage such as scraping of the outer peripheral surface of the insertion part can be avoided during the insertion into the hole. Meanwhile, the protrusions provided on the insertion part press-contacts the inner peripheral surface of the hole, and this press-contact force (elastic restoring force) can prevent the insertion part from falling off from the hole.

Further, the peripheral wall of the hole and the insertion part may be each provided with an insertion hole in a direction orthogonal to or intersecting the axial direction, and a rotation restricting member configured to restrict a rotation of the screw shaft may be inserted into each of the insertion hole. In this case, the rotation restricting member is inserted into each insertion hole with the insertion part inserted into the hole, and the rotation restricting member restricts axial movement of the insertion part with respect to the hole. Thus, the rotation restricting member functions as a falling prevention member that prevents the elastic member from falling off. Further, the rotation restricting member also functions as a falling prevention member, thereby eliminating the need for separately providing a falling prevention member, contributing to a cost reduction.

Further, a mark for specifying a peripheral phase of the insertion hole provided in the insertion part may be provided on a part of the elastic member exposed outside from the hole. Thus, an operator can confirm the peripheral phase of the insertion hole of the insertion part from outside after inserting the insertion part into the hole, and the operator can easily match the phases of the insertion holes provided in the insertion part and the phases of the insertion holes provided in the peripheral wall of the hole.

Advantageous Effects of Invention

In the present invention, even if the axial end surface of the screw shaft collides with the opposite surface of the case, the elastic member functions as a cushioning member that cushions an impact on the case due to this collision, and can avoid damage to the case.

DESCRIPTION OF EMBODIMENTS

Figure 1:
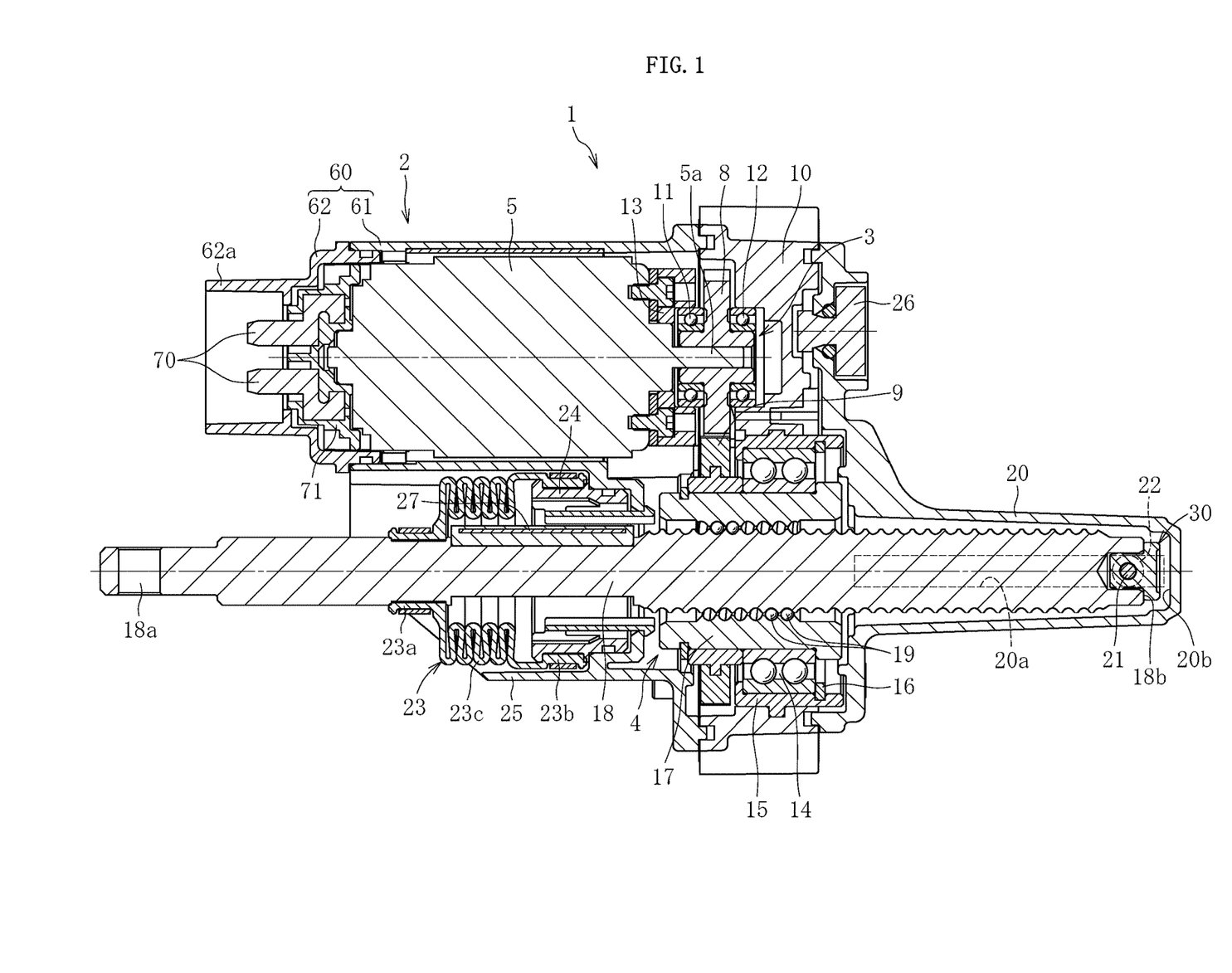
FIG. 1 is a sectional view of an electric actuator according to an embodiment of the present invention.

FIG. 1 is a sectional view of an electric actuator according to an embodiment of the present invention. First, an overall configuration and operation of the electric actuator according to the present embodiment will be described with reference to FIG. 1.

The electric actuator 1 shown in FIG. 1 mainly includes a motor section 2 having an electric motor 5, a driving force transmission mechanism 3 that transmits a rotary motion of the electric motor 5, and a motion conversion mechanism 4 that converts the rotary motion of the electric motor 5 into a linear motion.

The motor section 2 includes an electric motor 5, a pair of bus bars 70 as conductive members supplying electric power to the electric motor 5, and a motor case 60 accommodating the electric motor 5, the bus bars 70, and the like. In the present embodiment, an inexpensive DC motor (with a brush) is used as the electric motor 5, but another motor such as a brushless motor may be used.

The motor case 60 includes a cylindrical body 61 accommodating most part of the electric motor 5, and a lid-shaped cap 62 fixed to one end (left end in FIG. 1) of the body 61. Each bus bar 70 is formed by bending a metal plate member into a predetermined shape, and is held by a resin holder 71. Further, each bus bar 70 is connected to motor terminals (not shown) of the electric motor 5 by welding with the holder 71 fixed to an end (left end in FIG. 1) of the electric motor 5. The cap 62 is provided with a cylindrical connector 62a protruding in an axial direction, and a tip (an opposite end of an end connected to the motor terminals) of each bus bar 70 is disposed on an inner periphery of the connector 62a. A terminal at the other end of the power line extending from a power source (not shown) is connected to the tip of each bus bar 70, and the power source can supply electric power to the electric motor 5.

The driving force transmission mechanism 3 includes a drive gear 8 on a drive side and a driven gear 9 on a driven side that meshes with the drive gear 8. The drive gear 8 and the driven gear 9 are accommodated in a gear case 10. The drive gear 8 is a small-diameter gear having fewer teeth than the driven gear 9, and is attached so as to rotate integrally with a rotary shaft 5a of the electric motor 5. On the other hand, the driven gear 9 is a large-diameter gear having more teeth than the drive gear 8, and is attached so as to rotate integrally with a nut 17 described later that configures the motion conversion mechanism 4.

Further, the drive gear 8 is rotatably supported by two bearings 11 and 12 at both ends of the drive gear 8 in the axial direction. Of the two bearings 11 and 12, one bearing 11 (on the left in FIG. 1) is held by being fitted into a cylindrical bearing holding member 13 fixed to the end of the electric motor 5, and the other bearing 12 (on the right in FIG. 1) is held by being fitted into the gear case 10. The driven gear 9 is rotatably supported together with the nut 17 by a double-row bearing 14 provided on an outer peripheral surface of the nut 17. The double-row bearing 14 is accommodated in a cylindrical sleeve 15 provided in the gear case 10, and an axial movement of the double-row bearing 14 is restricted by a retaining ring 16 attached to the inner peripheral surface of the sleeve 15. As the double-row bearing 14, a double-row angular contact ball bearing capable of supporting an axial load in both directions in addition to a radial load is preferably used so as to be able to support the nut 17 stably and reliably.

When the electric motor 5 starts driving and the rotary shaft 5a of the electric motor 5 rotates, the drive gear 8 rotates integrally with the rotary shaft 5a, and the driven gear 9 rotates in conjunction with this rotation. At this time, the rotary motion from the electric motor 5 is transmitted from the drive gear 8 having fewer teeth to the driven gear 9 having more teeth, which reduces speed and increases a rotational torque. In this way, by increasing the rotational torque by decelerating between the drive gear 8 and the driven gear 9 and outputting the rotational torque, a sufficient output can be obtained by using a small electric motor. Note that, unlike the present embodiment, the drive gear 8 and the driven gear 9 may be configured with gears having the same number of teeth, and the rotary motion from the electric motor 5 may be transmitted without deceleration.

The motion conversion mechanism 4 is a ball screw mechanism including the nut 17 as a rotating member, a screw shaft 18 as a linear motion member, and multiple balls 19. Spiral grooves are formed on an inner peripheral surface of the nut 17 and an outer peripheral surface of the screw shaft 18, and the balls 19 are rollably accommodated between the spiral grooves. Further, the nut 17 is provided with a circulation member (not shown), and the balls 19 are configured to circulate along the spiral grooves by the circulation member.

The screw shaft 18 is inserted through an inner periphery of the nut 17 and is disposed parallel to the rotary shaft 5a of the electric motor 5. A connection hole 18a is provided at a front end (left end in FIG. 1) of the screw shaft 18, and by inserting a fastener such as a bolt into the connection hole 18a, the screw shaft 18 and a corresponding part of an apparatus as an operation target (not shown) are connected to each other. When the rotary motion of the electric motor 5 is transmitted to the nut 17 via the drive gear 8 and the driven gear 9, the nut 17 rotates to move the screw shaft 18 in one axial direction (forward or backward). On the contrary, when the electric motor 5 rotates in a reverse direction, the rotary motion is transmitted to the nut 17 via the drive gear 8 and the driven gear 9 to move the screw shaft 18 to the other axial direction. In this way, the forward or reverse rotation of the electric motor 5 causes the screw shaft 18 to move forward or backward, and thus the operation target connected to the front end of the screw shaft 18 is operated.

A rear end of the screw shaft 18 (end opposite to the end where the operation target is connected) is covered with a screw shaft case 20. The screw shaft case 20 is fixed to the gear case 10 on a position opposite to a position where a motor case 60 is fixed to the gear case 10.

Further, at the rear end of the screw shaft 18, a detent pin 21 is provided as a rotation restricting member that restricts a rotation of the screw shaft 18. The detent pin 21 is attached to the screw shaft 18 in a direction orthogonal to or intersecting the axial direction of the screw shaft 18. Guide rollers 22 are rotatably attached to both ends of the detent pin 21 protruding from the rear end of the screw shaft 18 in an outer diameter direction. The guide rollers 22 are inserted into a pair of guide grooves 20a provided in the screw shaft case 20 and extending in the axial direction. In response to the axial movement of the guide roller 22 along the guide groove 20a, the screw shaft 18 moves forward or backward in the axial direction without rotating in the peripheral direction.

Further, the screw shaft 18 is provided with a boot 23 preventing foreign matter from entering the electric actuator 1 and a boot cover 25 protecting the boot 23 closer to the front end of the nut 17. The boot 23 includes a small-diameter end 23a, a large-diameter end 23b, and bellows 23c connecting the small-diameter end 23a and the large-diameter end 23b and expanding and contracting in the axial direction. The small-diameter end 23a is fixed to the outer peripheral surface of the screw shaft 18, and the large-diameter end 23b is fixed to an outer peripheral surface of a cylindrical boot attachment member 24 attached to the boot cover 25. The boot cover 25 is disposed to cover the outside of the boot 23, and is integrally molded with the body 61 of the motor case 60.

In response to the expansion or contraction of the boot 23 due to a reciprocating motion of the screw shaft 18, a pressure inside the boot 23 fluctuates. Thus, the bellows 23c may be excessively deformed due to the internal pressure fluctuation especially when an amount of axial movement of the screw shaft 18 is large, and then durability of the bellows 23c may decrease. In order to prevent damage to the bellows 23c due to the fluctuations in the internal pressure of the boot 23, a ventilation filter 26 is provided in the screw shaft case 20. The ventilation filter 26 communicates with an internal space of the boot 23 through the electric actuator 1. When the boot 23 expands and contracts, air flows in or out through the ventilation filter 26 to suppress the deformation of the bellows 23c.

Further, on the outer peripheral surface of the screw shaft 18, a magnet 27 serving as a sensor target detecting an axial position of the screw shaft 18 is provided. Meanwhile, a stroke sensor (not shown) is provided on an outer periphery of the motor case 60. When the screw shaft 18 moves forward or backward, the stroke sensor detects a change in a magnetic field (for example, a direction and strength of a magnetic flux density) of the magnet 27 that moves in accordance with the movement of the screw shaft 18. Thus, an axial position of the magnet 27 and the axial position of the screw shaft 18 are detected.

As described above, in the electric actuator 1 according to the present embodiment, a forward position and a backward position of the screw shaft 18 can be controlled and managed by using the stroke sensor. Thus, the screw shaft 18 basically does not move forward or backward beyond a predetermined stop position. However, if the screw shaft 18 malfunctions due to a failure of the stroke sensor or the like and retracts beyond the predetermined stop position, the rear end of the screw shaft 18 may collide with the screw shaft case 20 and damage the screw shaft case 20. In addition, the rear end of the screw shaft 18 may collide with the screw shaft case 20 due to a handling error during parts assembly. In that case, the collision of the screw shaft 18 may damage the screw shaft case 20.

Thus, in the present embodiment, the following measures are taken in order to prevent such damage to the screw shaft case 20.

Figure 2:
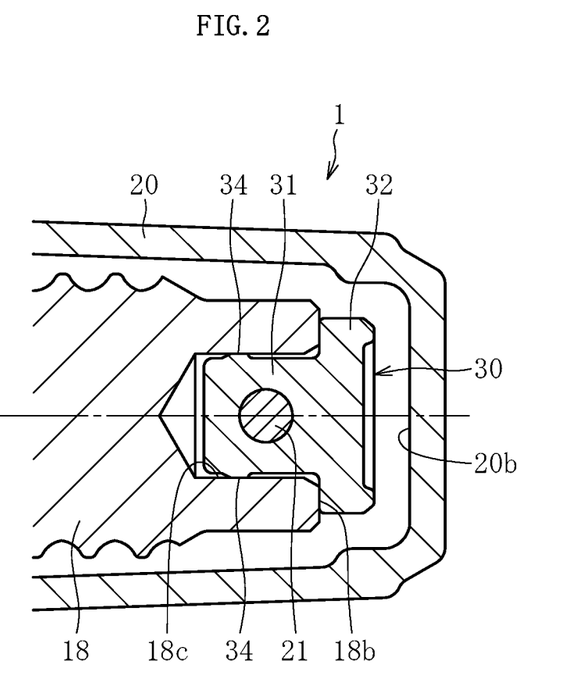
FIG. 2 is an enlarged sectional view showing a rear end of a screw shaft and a part of a shaft case of the electric actuator shown in FIG. 1.

FIG. 2 is an enlarged sectional view showing the rear end of the screw shaft 18 and a part of the shaft case 20 of the electric actuator 1 shown in FIG. 1.

As shown in FIG. 2, in the electric actuator 1 according to the present embodiment, in order to prevent the screw shaft case 20 from being damaged due to the collision of the rear end of the screw shaft 18, an elastic member 30 including rubber or the like is provided on a rear end surface 18b of the screw shaft 18. By providing the elastic member 30 on the rear end surface 18b of the screw shaft 18 in this way, even if the screw shaft 18 retracts beyond the predetermined stop position, the elastic member 30 contacts the screw shaft case 20, thereby preventing the screw shaft case 20 from being damaged. That is, the elastic member 30 functions as a cushioning member disposed between the rear end surface 18b of the screw shaft 18 and an opposite surface 20b of the screw shaft case 20 facing the rear end surface 18b and alleviating the impact caused by the collision between the rear end surface 18b and the opposite surface 20b.

Further, as shown in FIG. 2, the elastic member 30 according to the present embodiment includes an insertion part 31 having a columnar shape and inserted into an axial hole 18c disposed on the rear end surface 18b of the screw shaft 18, and a cushioning part 32 having a larger diameter than the insertion part 31. The cushioning part 32 is disposed so as to protrude axially outward (toward the opposite surface 20b of the screw shaft case 20) of the hole 18c with the insertion part 31 inserted into the hole 18c. The cushioning part 32 contacts the opposite surface 20b of the screw shaft case 20 when the screw shaft 18 retracts beyond the predetermined stop position.

Figure 3:
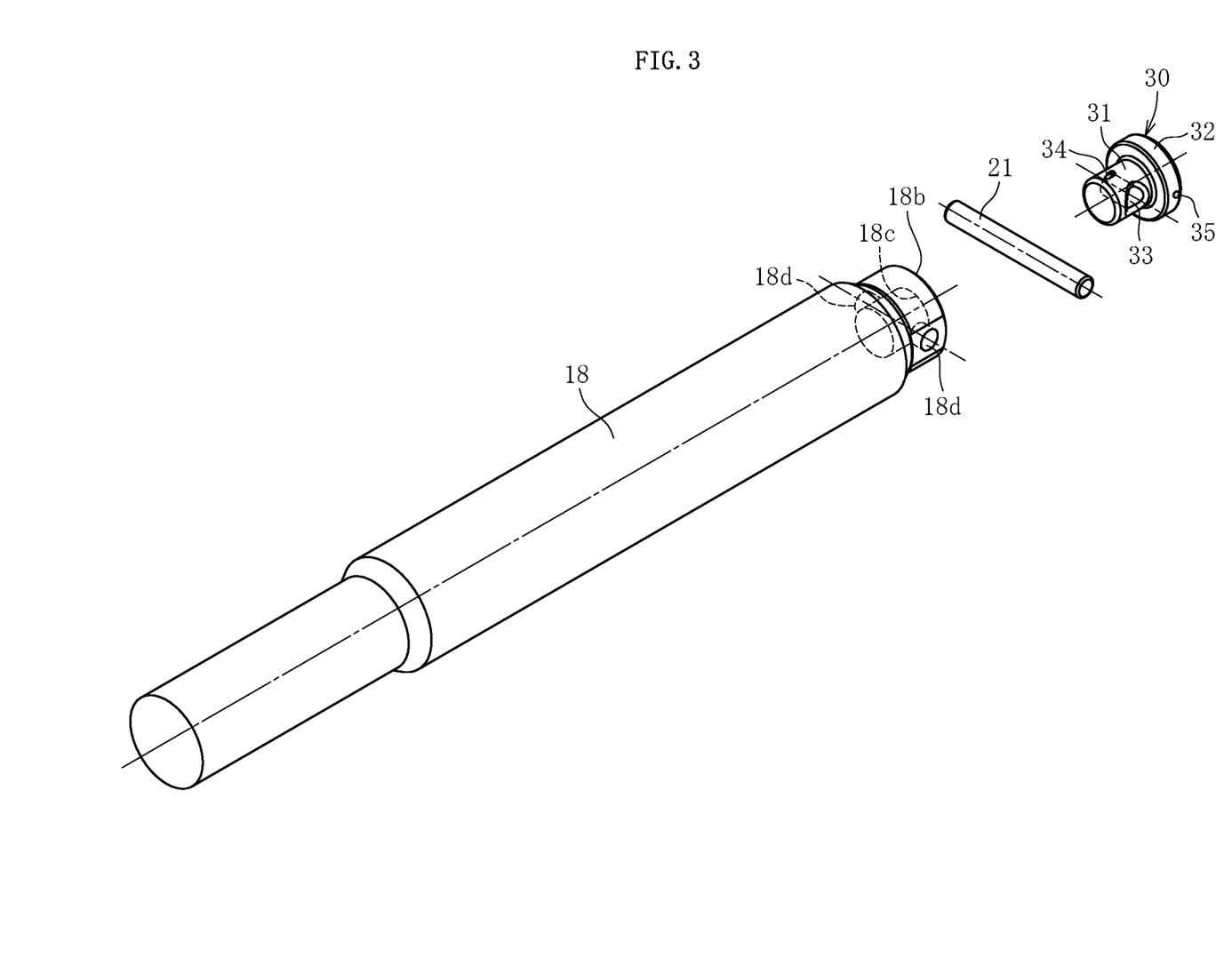
FIG. 3 is an exploded perspective view showing a state in which an elastic member and a detent pin are detached from the rear end of the screw shaft.

FIG. 3 is an exploded perspective view showing a state in which the elastic member 30 and the detent pin 21 are detached from the rear end of the screw shaft 18. In FIG. 3, the spiral grooves provided on the outer peripheral surface of the screw shaft 18 are omitted.

As shown in FIG. 3, a peripheral wall of the hole 18c provided in the rear end surface 18b of the screw shaft 18 and the insertion part 31 of the elastic member 30 are respectively provided with insertion holes 18d and 33 into which the detent pin 21 is inserted. The insertion holes 18d and 33 are disposed in a direction orthogonal to or intersecting the axial direction of, respectively, the screw shaft 18 and the axial direction of the elastic member 30 corresponding to the axial direction of the screw shaft 18 so as to penetrate the screw shaft 18 and the elastic member 30, respectively.

To assemble the elastic member 30 and the detent pin 21 to the screw shaft 18, first, the insertion part 31 of the elastic member 30 is inserted into the hole 18c of the screw shaft 18. Next, with peripheral phases of the insertion holes 18d and 33 matching each other, the detent pin 21 is inserted into the insertion holes 18d and 33 and assembled such that the detent pin 21 penetrates the screw shaft 18 and the elastic member 30. Finally, attaching the above guide roller 22 to both ends of the detent pin 21 prevents the detent pin 21 from coming off from the insertion holes 18d and 33.

Here, if an outer diameter of the insertion part 31 of the elastic member 30 is set to a diameter equal to or slightly larger than an inner diameter of the hole 18c of the screw shaft 18, the outer peripheral surface of the insertion part 31 contacts or press-contacts the inner peripheral surface of the hole 18c in the entire peripheral direction. This can prevent the insertion part 31 from falling off using friction force of the insertion part 31 and the hole 18c. However, in this configuration in which the entire outer peripheral surface of the insertion part 31 contacts the inner peripheral surface of the hole 18c, the outer peripheral surface of the insertion part 31 may be scraped or damaged upon the insertion of the insertion part 31 into the hole 18c. On the other hand, if the outer diameter of the insertion part 31 is set to a diameter smaller than the inner diameter of the hole 18c, the insertion part 31 may fall off from the hole 18c during assembly, which is inconvenient to handle.

Thus, in the present embodiment, as shown in FIG. 2, a plurality of protrusions 34 is provided on the outer peripheral surface of the insertion part 31, and the protrusions 34 press-contact the inner peripheral surface of the hole 18c. This can prevent the insertion part 31 from falling off from the hole 18c. In the present embodiment, two protrusions 34 are provided at positions symmetrical with each other by 180°, but the number of protrusions 34 may be one or three or more.

Figure 4:
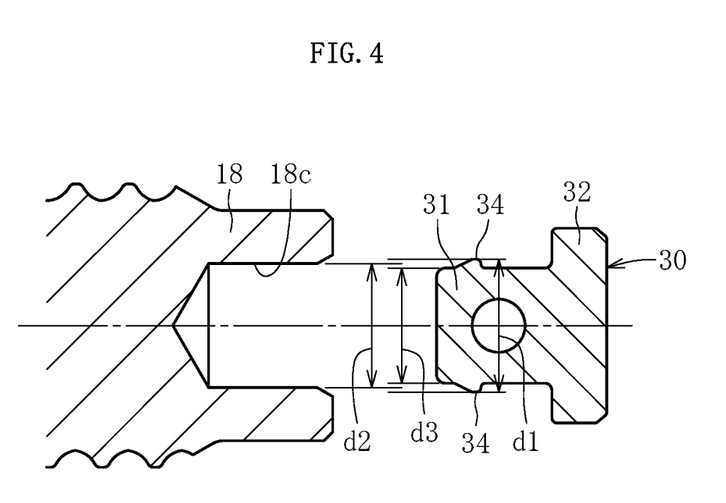
FIG. 4 is a sectional view showing a state of the elastic member before being assembled to the screw shaft.

FIG. 4 is a sectional view showing a state of the elastic member 30 before being assembled to the screw shaft 18.

As shown in FIG. 4, with a central axis of the hole 18c and a central axis of the insertion part 31 before assembly are disposed coaxially, the protrusions 34 of the insertion part 31 disposed to protrude toward the outer diameter direction from the cylindrical inner peripheral surface (without unevenness) of the hole 18c. In the configuration according to the present embodiment, a radial dimension d1 from a top of one protrusion 34 to a top of the other protrusion 34 disposed at the positions symmetrical with each other by 180° is set to be larger than an inner diameter d2 of the hole 18c. Therefore, when the insertion part 31 is inserted into the hole 18c, the protrusions 34 contact the inner peripheral surface of the hole 18c and are compressed in an inner diameter direction, and the protrusions 34 press-contact the inner peripheral surface of the hole 18c. This press-contact force (elastic restoring force) prevents the insertion part 31 from falling off from the hole 18c.

Meanwhile, an outer diameter d3 of the insertion part 31 is set to a diameter smaller than the inner diameter d2 of the hole 18c as shown in FIG. 4, thereby avoiding damage such as scraping to the outer peripheral surface of the insertion part 31 during the insertion into the hole 18c. Further, as compared with the configuration in which the outer peripheral surface of the insertion part 31 contacts the inner peripheral surface of the hole 18c over the entire periphery, the frictional force between the insertion part 31 and the hole 18c is reduced. This facilitates the insertion of the insertion part 31 into the hole 18c and the phase matching of the insertion holes 18d and 33 during the assembly of the detent pin 21.

Further, in the present embodiment, as shown in FIG. 3, a mark 35 specifying a peripheral phase of the insertion hole 33 of the insertion part 31 is provided on the outer peripheral surface of the cushioning part 32 of the elastic member 30 so as to easily match the phases of the insertion holes 18d and 33. In the present embodiment, the mark 35 is configured by a protruding part, but it may be a recess or a mark that can be identified by coloring. Further, in the present embodiment, the mark 35 is disposed in the same peripheral phase as the insertion hole 33 of the insertion part 31. However, the mark 35 may be disposed on a peripheral phase different from the insertion hole 33 such as a position offset from the insertion hole 33 by 90°. In this way, the mark 35 specifying the peripheral phase of the insertion hole 33 of the insertion part 31 is provided at a part (cushioning part 32) exposed outside from the hole 18c. Thus, an operator can confirm the peripheral phase of the insertion hole 33 of the insertion part 31 from outside after inserting the insertion part 31 into the hole 18c, and the operator can easily match the phases of the insertion holes 18d and 33.

Further, as described above, assembling the detent pin 21 to the screw shaft 18 makes it possible to reliably prevent the elastic member 30 from falling off from the screw shaft 18. That is, the detent pin 21 is assembled while penetrating the screw shaft 18 and the insertion part 31 in a direction orthogonal to or intersecting the insertion direction or a falling direction of the insertion part 31 with respect to the hole 18c. Thus, even if the insertion part 31 is to move in the falling direction, the movement is restricted by the detent pin 21. As described above, in the present embodiment, the detent pin 21 functions as a falling prevention member for the elastic member 30, and the elastic member 30 is reliably prevented from falling off from the hole 18c. This eliminates the need for separately providing a dedicated falling prevention member and reduces costs.

Although the embodiments of the electric actuator of the present invention have been described above, the present invention is not limited to the above embodiments, and can be further implemented in various forms without departing from the gist of the present invention.

In the above embodiment, the elastic member 30 is provided on the rear end surface 18b of the screw shaft 18, but the elastic member 30 may be provided on the opposite surface 20b of the screw shaft case 20. When the case is provided at the front end of the screw shaft 18 (the end where the operation target is connected), the elastic member 30 may be provided on a front end surface of the screw shaft 18 or the opposite surface of the case facing the front end surface of the screw shaft 18. In short, the present invention is applicable as long as at least one axial end surface of the screw shaft and the case covering the at least one axial end surface are provided. By providing the elastic member between the axial end surface of the screw shaft and the opposite surface of the case facing the axial end surface, it is possible to avoid damage to the case due to the collision between the axial end surface of the screw shaft and the opposite surface of the case. Further, the elastic member alleviating an impact on the case is not limited to a rubber elastic body as described in the above embodiment, but a spring structure is also be applicable.

Further, in the above embodiment, a configuration using a ball screw mechanism as the motion conversion mechanism is exemplified. However, the present invention is also applicable to an electric actuator including a sliding screw mechanism including a screw shaft and a nut screwed with a screw shaft.

REFERENCE SIGNS LIST 1 electric actuator
3 driving force transmission mechanism
4 motion conversion mechanism
5 electric motor
17 nut
18 screw shaft
18b rear end surface
18c hole
18d insertion hole
19 ball
20 screw shaft case
20b opposite surface
21 detent pin (rotation restricting member)
30 elastic member
31 insertion part
32 cushioning part
33 insertion hole
34 protrusion
35 mark

The invention claimed is:
1. An electric actuator comprising:
a case;
an elastic member;
an electric motor; and
a motion conversion mechanism configured to convert a rotary motion of the electric motor into a linear motion, wherein
the motion conversion mechanism has a nut rotatably supported, and a screw shaft configured to axially move in accordance with a rotation of the nut,
the case covers an axial end surface of the screw shaft, the elastic member is located between the axial end surface of the screw shaft and an opposite surface of the case facing the axial end surface of the screw shaft, the elastic member is located on the axial end surface of the screw shaft, the screw shaft has a hole in an axial direction on the axial end surface of the screw shaft, the elastic member has an insertion part to be inserted into the hole, the insertion part has an outer diameter set to be smaller than an inner diameter of the hole, and the insertion part is provided with a protrusion in press-contact with an inner peripheral surface of the hole with the insertion part inserted into the hole.

2. An electric actuator comprising:

a case;

an elastic member;

an electric motor; and a motion conversion mechanism configured to convert a rotary motion of the electric motor into a linear motion, wherein the motion conversion mechanism has a nut rotatably supported, and a screw shaft configured to axially move in accordance with a rotation of the nut, the case covers an axial end surface of the screw shaft, the elastic member is located between the axial end surface of the screw shaft and an opposite surface of the case facing the axial end surface of the screw shaft, the elastic member is located on the axial end surface of the screw shaft, the screw shaft has a hole in an axial direction on the axial end surface of the screw shaft, the elastic member has an insertion part to be inserted into the hole, a peripheral wall of the hole and the insertion part are each provided with an insertion hole in a direction orthogonal to or intersecting the axial direction, and a rotation restricting member configured to restrict a rotation of the screw shaft is inserted into each of the insertion holes.

3. The electric actuator according to claim 2, wherein a mark for specifying a peripheral phase of the insertion hole provided in the insertion part is provided on a part of the elastic member exposed outside from the hole.

* * * * *